United States Patent
Pieterse et al.

[11] Patent Number: 5,907,832
[45] Date of Patent: May 25, 1999

[54] METHOD OF DEBITING AN ELECTRONIC PAYMENT MEANS

[75] Inventors: Rob Pieterse, Aerdenhout; Willem Rombaut, The Hague, both of Netherlands

[73] Assignee: Koninklijke PTT Nederland N.V., The Hague, Netherlands

[21] Appl. No.: 08/751,156

[22] Filed: Nov. 15, 1996

[30] Foreign Application Priority Data

Nov. 15, 1995 [NL] Netherlands ............................ 1001659

[51] Int. Cl.$^6$ .................................................. G06F 17/60
[52] U.S. Cl. .................. 705/39; 380/21; 380/24
[58] Field of Search .............................. 380/3, 4, 21, 22, 380/24, 35, 38, 44, 45, 51; 705/39, 40, 41, 42, 44

[56] References Cited

U.S. PATENT DOCUMENTS

| | | | |
|---|---|---|---|
| 4,864,110 | 9/1989 | Guillou | 235/380 |
| 5,068,894 | 11/1991 | Hoppe | 380/23 |
| 5,103,478 | 4/1992 | Matyas et al. | 380/25 |
| 5,347,580 | 9/1994 | Molva et al. | 380/25 |
| 5,436,971 | 7/1995 | Armbrust et al. | 380/23 |
| 5,495,098 | 2/1996 | Pailles et al. | 235/492 |
| 5,544,246 | 8/1996 | Mandelbaum et al. | 380/23 |
| 5,594,233 | 1/1997 | Kenneth et al. | 235/492 |
| 5,635,695 | 6/1997 | Feiken | 235/380 |
| 5,687,237 | 11/1997 | Naclerio | 380/29 |
| 5,721,781 | 2/1998 | Deo et al. | 380/25 |

FOREIGN PATENT DOCUMENTS

| | | |
|---|---|---|
| 0 223 213 | 5/1987 | European Pat. Off. . |
| 0223213 | 5/1987 | European Pat. Off. . |
| 0 570 924 | 11/1993 | European Pat. Off. . |
| 0570924 | 11/1993 | European Pat. Off. . |
| 0 574 990 | 12/1993 | European Pat. Off. . |
| 0574990 | 12/1993 | European Pat. Off. . |
| 0 621 570 | 10/1994 | European Pat. Off. . |
| 0621570 | 10/1994 | European Pat. Off. . |
| 0 637 004 | 2/1995 | European Pat. Off. . |
| 0637004 | 2/1995 | European Pat. Off. . |

Primary Examiner—James P. Trammell
Attorney, Agent, or Firm—Oblon, Spivak, McClelland, Maier & Neustadt, P.C.

[57] ABSTRACT

The invention provides a method for protectedly debiting an electronic payment mechanism, such as a telephone card. In the communication protocol between the payment mechanism and payment station, an authentication is used to identify the payment mechanism during various steps of the protocol. According to the invention, the authentications are mutually related by states of a cryptographic process in order to be capable of detecting an interference in the protocol. The method may be applied to existing payment cards having a dynamic memory, it being guaranteed that the contents of the dynamic memory, in which there is located information related to the authentication, is not lost during the protocol.

17 Claims, 5 Drawing Sheets

METHOD OF DEBITING AN ELECTRONIC PAYMENT MEANS

BACKGROUND OF THE INVENTION

FIELD OF THE INVENTION

The invention relates to a method of debiting an electronic payment means, such as an electronic payment card provided with an integrated circuit ("chip card"). In particular, though not exclusively, the invention relates to a method for protectedly debiting prepaid electronic payment cards ("prepaid cards") as these are applied, e.g., for telephone booths. In the present text, the term payment means will be used irrespective of the form or the type of the specific payment means. A payment means may therefore be formed by, e.g., a revaluable payment card (i.e. a payment card whose balance may be increased) or a non-card-shaped electronic payment means.

In recent years, electronic payment means are being applied ever more frequently, not only for paying for the use of public telephone sets, but also for many other payment purposes. Since such a payment means generally comprises a (credit) balance which represents a monetary value, it is necessary to have the exchange of data between such a payment means and a payment station (such as a telephone set designed for electronic payment or an electronic cash register) run according to a protected method (payment protocol). Here, it should be ensured, e.g., that an amount (monetary value or number of calculation units) debited to the payment means correspond to an amount (monetary value or calculation units) credited elsewhere: the amount paid by a customer should correspond to the amount to be received by a supplier. The credited amount may be stored, e.g., in a protected module present in the payment station.

Prior Art payment methods, as disclosed in e.g. European Patent Application EP 0,637,004 which is incorporated by reference in this text, comprise: a first step, in which the balance of the payment means is retrieved by the payment station; a second step, in which the balance of the payment means is lowered (debiting the payment means); and a third step, in which the balance of the payment means is retrieved again. From the difference between the balances of the first and third steps the debited amount may be determined and therewith the amount to be credited in the payment station. In order to prevent fraud here, in the first step use is made of a random number which is generated by the payment station and is transferred to the payment means. On the basis of the first random number, the payment means generates, as a first response, an authentication code which may comprise an (e.g., cryptographic) processed form of, inter alia, the random number and the balance. By using a different random number for each transaction, it is prevented that a transaction may be imitated by replay. In addition, in the third step use is made of a second random number, which is also generated by the payment station and transferred to the payment means. On the basis of the second random number the payment means generates, as a second response, a second and new authentication code which may comprise a processed form of, inter alia, the second random number and the new balance. On the basis of the difference between the two transferred balances, the payment station (or a protected module of the payment station) determines by which amount the balance of the payment station should be credited.

Said known method is basically very resistant to fraud as long as a payment means communicates with one payment station (or protected module). The drawback of the known method, however, lies in the fact that the first and second authentication codes are independent. If a second or third payment station (or protected module) communicates with the payment means, it is possible, due to said independence, to separate the first step from the second and third steps. As a result, an apparently complete transaction may be achieved without the payment means in question being debited. It will be understood that such is undesirable.

U.S. Pat. No. 5,495,098, incorporated by reference in this text, discloses a method in which the identity of the security module of the payment station is used to ensure that a data exchange takes place between the card and one terminal only. The protection of the data exchange between the security module, the station and the card is relatively complicated and requires extensive cryptographic calculations.

Other Prior Art methods are disclosed in e.g. European Patent Applications EP 0,223,213 and EP 0,570,924, but these documents do not offer a solution to the above-mentioned problems.

SUMMARY OF THE INVENTION

It is an object of the invention to eliminate the above and other drawbacks of the Prior Art, and to provide a method which offers an even greater degree of protection of debiting transactions. In particular, it is an object of the invention to provide a method which ensures that during a transaction only one payment station is credited.

Accordingly, the present invention provides a method of performing a transaction using an electronic payment means and a payment station, the method comprising the repeated execution of an interrogation step in which the payment station interrogates the payment means and receives payment means data in response, the payment means data comprising an authentication code produced by a predetermined process, each authentication code being linked to a preceding authentication code of the same transaction by states of said process.

By providing a link between the authentication codes, it can be ensured that the payment means data received by the payment station are unique to that payment station. In order to link the authentication codes of the different steps the process, in an interrogation step, preferably uses an initial value derived from the final state of the process in the preceding interrogation step.

More specifically, the present invention provides a method of protectedly debiting an electronic payment means using a payment station, the method comprising:

a first step, in which:
    the payment station transfers a first random value to the payment means,
    the payment means, in response to said first random value, transfers a first authentication code to the payment station, which authentication code is determined on the basis of at least a first start value, the first random value and the current balance of the payment means using a predetermined process, the process further producing a first end value, a second step, in which:
    the payment station transfers a debiting command to the payment means, and the balance of the payment means is lowered on the basis of the debiting command, and a third step, in which:
    the payment means transfers a second random value to the payment means, and the payment means, in response to said second random value, transfers a second authentication code to the payment station, which authentication code is determined on the basis of at least a second start value, the second random value and the current balance of the payment means using said process, the second start value being based on the first end value.

The method according to the invention is thus characterized in that the second start value is based on the first end value.

By basing the second start value on the first end value, i.e. on the state of the process after completion of the first authentication code, a direct coupling between the first step and the remaining steps is obtained and it is no longer possible to interrupt the method, or to exchange data with other payment stations, without such being noticed. Here, the second start value, which may form, e.g., the initialization vector of a cryptographic process, may be identical to the first end value or be derived from the first end value. In the first case the first end value may be stored, in the second case the second start value may be, e.g., the state of a (cryptographic) process which, starting from the first end value, has been executed a number of times. In either case, the second start value may be reproduced from the first end value, as a result of which a check on the authenticity is offered, and thereby on the continuity of the method.

The process may, in the third step, produce a second end value which may be used for deriving start values for possible additional steps.

The invention is therefore based on the insight that the application of multiple independent start values on authentications in consecutive steps of a debiting transaction under certain circumstances creates the possibility that not all steps of the transaction are carried out between the same pair of a payment means and a payment station.

The invention further provides an advantageous implementation of the said method in existing electronic payment means.

In the above reference is made to a payment station with which the payment means (card) communicates. A payment station may have an integrated storage of transaction data or a separate module. It will be understood that the payment means may in practice communicate with the protected module ("Security Module") via the payment station in case the payment station uses such a module for the secure storage of transaction data.

BRIEF DESCRIPTION OF THE DRAWINGS

The invention will be explained in greater detail below by reference to the Figures.

PREFERRED EMBODIMENTS

Figure 1:
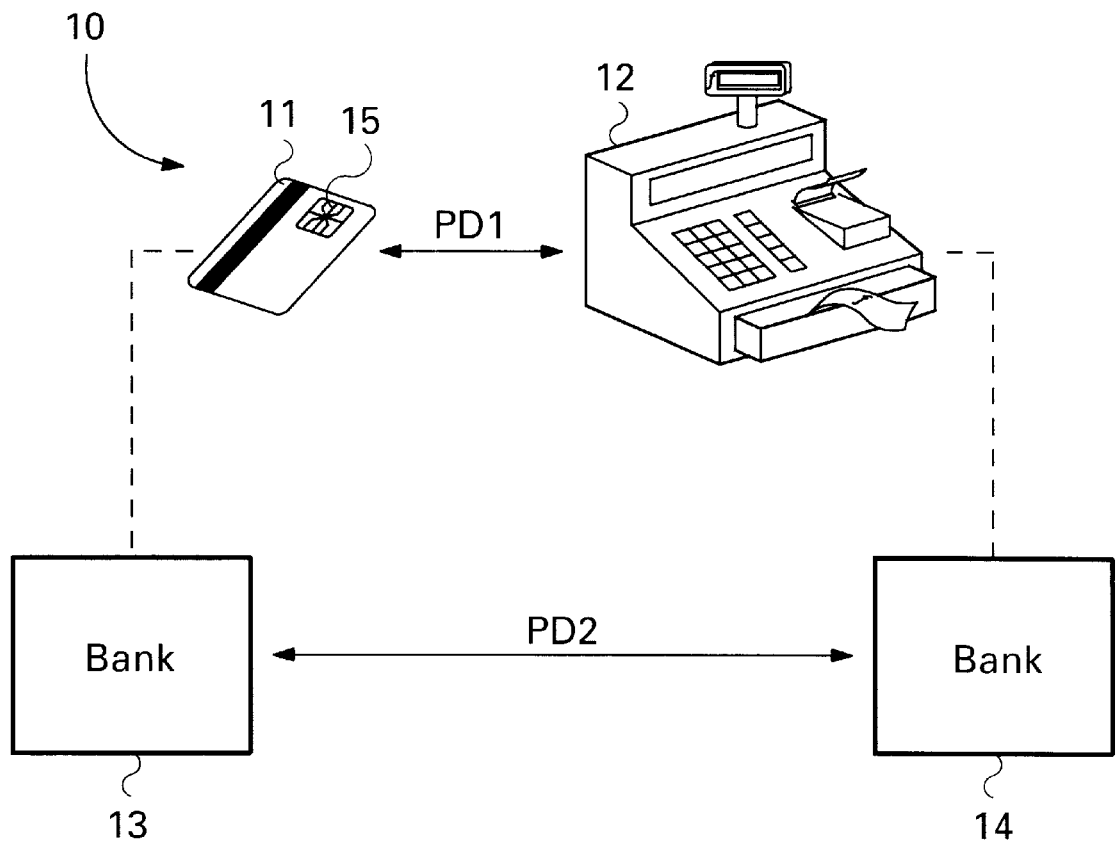
FIG. 1 schematically shows a payment system in which the invention may be applied.

The system 10 for electronic payment schematically shown in FIG. 1, by way of example comprises an electronic payment means, such as a so-called chip card or smart card 11, a payment station 12, a first payment institution 13, and a second payment institution 14. The payment station (terminal) 12 is shown in FIG. 1 as a cash register, but may also comprise, e.g., a (public) telephone set. The payment institutions 13 and 14, both denoted as bank in FIG. 1, may not only be banks but also further institutions having at their disposal means (computers) for settling payments. In practice, the payment institutions 13 and 14 may form one payment institution. In the example shown, the payment means 11 comprises a substrate and an integrated circuit having contacts 15, which circuit is designed for processing (payment) transactions. The payment means may also comprise an electronic wallet.

Between the payment means 11 and the payment station 12 there takes place, during a transaction, an exchange of payment data PD1. The payment means 11 is associated with the payment institution 13, while the payment station 12 is associated with the payment institution 14. Between the payment institutions 13 and 14 there takes place, after a transaction, a settlement by exchanging payment data PD2, which is derived from the payment data PD1. During a transaction there basically does not take place communication between the payment station 12 and the payment institution 14 in question (so-called offline system). Transactions must therefore occur under controlled conditions to ensure that there can take place no abuse of the system. Such an abuse may be, e.g., increasing a balance of the payment means (card) 11 which is not matched by a balance change of a counterpart account at the payment institution 13.

Figure 2:
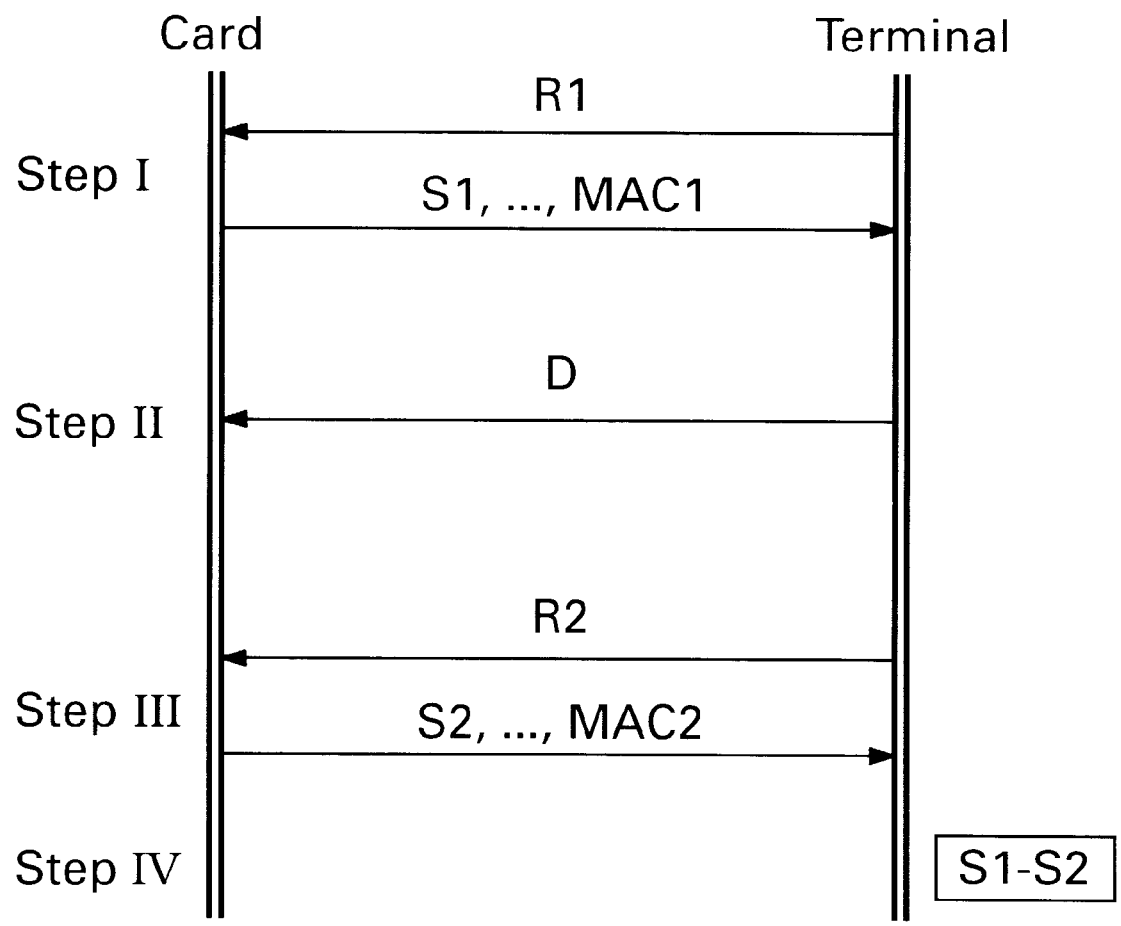
FIG. 2 schematically shows a method in which the invention is applied.

The diagram of FIG. 2 shows the exchange of data between (the integrated circuit of) a payment means denoted as "Card" (11 in FIG. 1) and (the security module of) a payment station denoted as "Terminal" (12 in FIG. 1), with consecutive occurrences being shown one below the other.

In the first step, denoted by I, the terminal produces a first random number R1 and transfers this number to the card (substep I$a$). On the basis of the random number R1 and other data, preferably including the card balance S1, the card produces an authentication code MAC1=F(R1, S1, . . . ), where F may be a cryptographic function known per se. This will later be further explained with reference to FIGS. 3 and 4. The code MAC1 ("Message Authentication Code") is transferred to the terminal along with at least the balance S1 (substep I$b$). After checking the authentication code MAC1, the terminal records the balance S1.

In the second step, denoted by II, the terminal produces a debiting command D, which comprises the value (amount) to be debited to the card. The debiting command D is transferred to the card, whereafter the balance S1 of the card is lowered by the amount to be debited, resulting in a new balance S2. The carrying out of step II is not essential to the invention. In practice, step II may be carried out an arbitrary number of times, including zero.

In the third step, denoted by III, the terminal produces a second random number R2 and transfers this to the card (substep III$a$). On the basis of the random number R2 and other data, including the new balance S2 of the card, the card produces an authentication code MAC2=F(R2, S2, . . . ), where F may be a cryptographic function known per se. The new balance S2 and the authentication code MAC2 are transferred to the terminal (substep III$b$). The terminal checks the authentication code MAC2, e.g., by regenerating the code using R2 and S2, and comparing the regenerated and received codes. Alternatively, the terminal may decipher the code MAC2 to obtain R2 and S2. Said deciphering may take place, e.g., by carrying out the inverse of the function F.

After a positive check of the code MAC2, the new balance S2 is recorded in the terminal.

In a fourth step, denoted by IV, the difference of the balances S1 and S2 is determined in the terminal and recorded there. In this connection, such difference may either be stored separately or be added to an existing value (balance of the payment station) to be settled later. Said fourth step, as well as possible following steps, is not essential for the invention. The steps shown in FIG. 2 may be preceded by an authentication or verification step in which the key is identified which is to be used for producing the authentication codes. Preferably, a different key is used for each batch of cards or even for each individual card. This may for example be accomplished by means of key diversification on the basis of a card identity number, a technique well known in the art.

In the diagram discussed above, the random values R1 and R2 are different. The random values R1 and R2 may be identical (R1=R2=R), however, so that in step III it may be checked whether in the authentication code MAC2 use is still being made of the same random number R (=R1).

According to the prior art, the authentication values MAC1 and MAC2 are basically independent. This is to say that, if the random numbers R1 and R2 differ, there is no direct or indirect relationship between the values of MAC1 and MAC2 since the process (function F) with which the authentication code is determined, always assumes the same start value, namely, the start value zero. Due to this independence, there is basically no guarantee that the steps I and III are carried out between the same pair of a card and a payment station.

According to the invention, however, when determining the second authentication code (MAC2) there is assumed a start value which is the result of the determination of the first authentication code (MAC1). As a second start value there may be used, e.g., the state of the (cryptographic) process after the determination of the first authentication code. In this connection it is not essential whether the process, after the determination of the first authentication code, has still gone through a number of process steps, since the dependence and the reproducibility of the second start value will be guaranteed.

The dependence of the start values in accordance with the invention ensures that all steps of the transaction, in which the method according to the invention is applied, take place between the same card and the same payment station.

Figure 5:
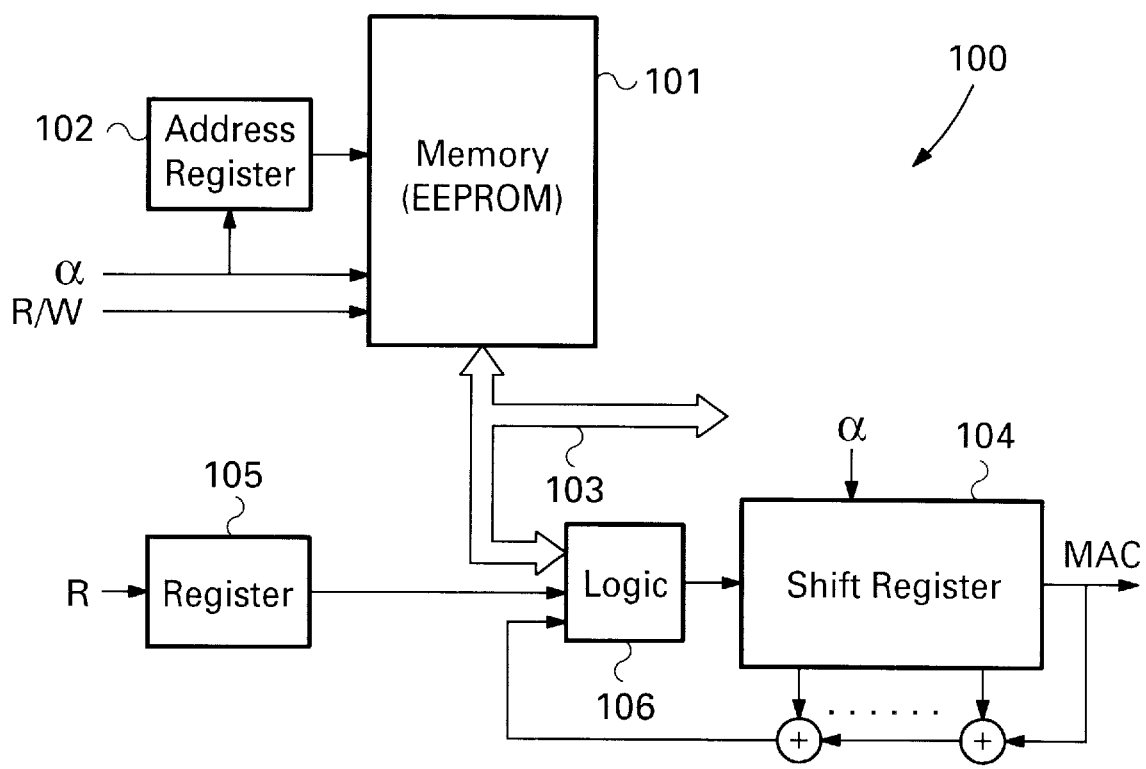
FIG. 5 schematically shows the integrated circuit of a payment means with which the invention may be applied.

The relationship between the start values will now be explained with reference to FIG. 3, in which the steps I and III may be identical to the steps I and III in FIG. 2. In step I, the first authentication code MAC1 is generated using a function F, which may be a cryptographic function known per se, such as a DES ("Data Encryption Standard") function, or a relatively simple combinatorial function (see also FIG. 5) or "hash" function. This function F has the first random value R1, the first (old) balance S1, a key K and a first start value Q1 as input parameters. Optionally, an identification of a debiting command (as used in step II) may be used as input parameter. A clock pulse α, which may be identical to the clock α of FIG. 5, is shown to control the processing.

The first start value (initialization vector) Q1 may be equal to zero or to another preset initial value if no previous processing involving the function F has taken place before activation of the card (activation may take place by inserting the card in the terminal).

The function F produces an authentication code MAC1. Additionally, the state ("residue") of the function F is saved as first end value Y1. This first end value Y1 will later be used in step III as second start value Q2 (Q2=Y1), thus linking the first and third steps.

In step III, the second authentication code MAC2 is generated using the function F, which preferably is identical to the function F of step I. Here, the function F has the second random value R2, the second (new) balance S2, the key K and the second start value Q2 as input parameters. The function F produces the second authentication code MAC2 and, additionally, the second end value Y2 which is the state of the function F after the processing. The second end value Y2 may be saved to be used as third start value (Q3) in case a third authentication code (MAC3) involving the same card and security module (terminal) is required. Generally, the deactivation of the card (e.g. by removing the card from the terminal) will result in the current end value (e.g. Y2) being lost. This guarantees the uniqueness of the transaction.

Figure 3:
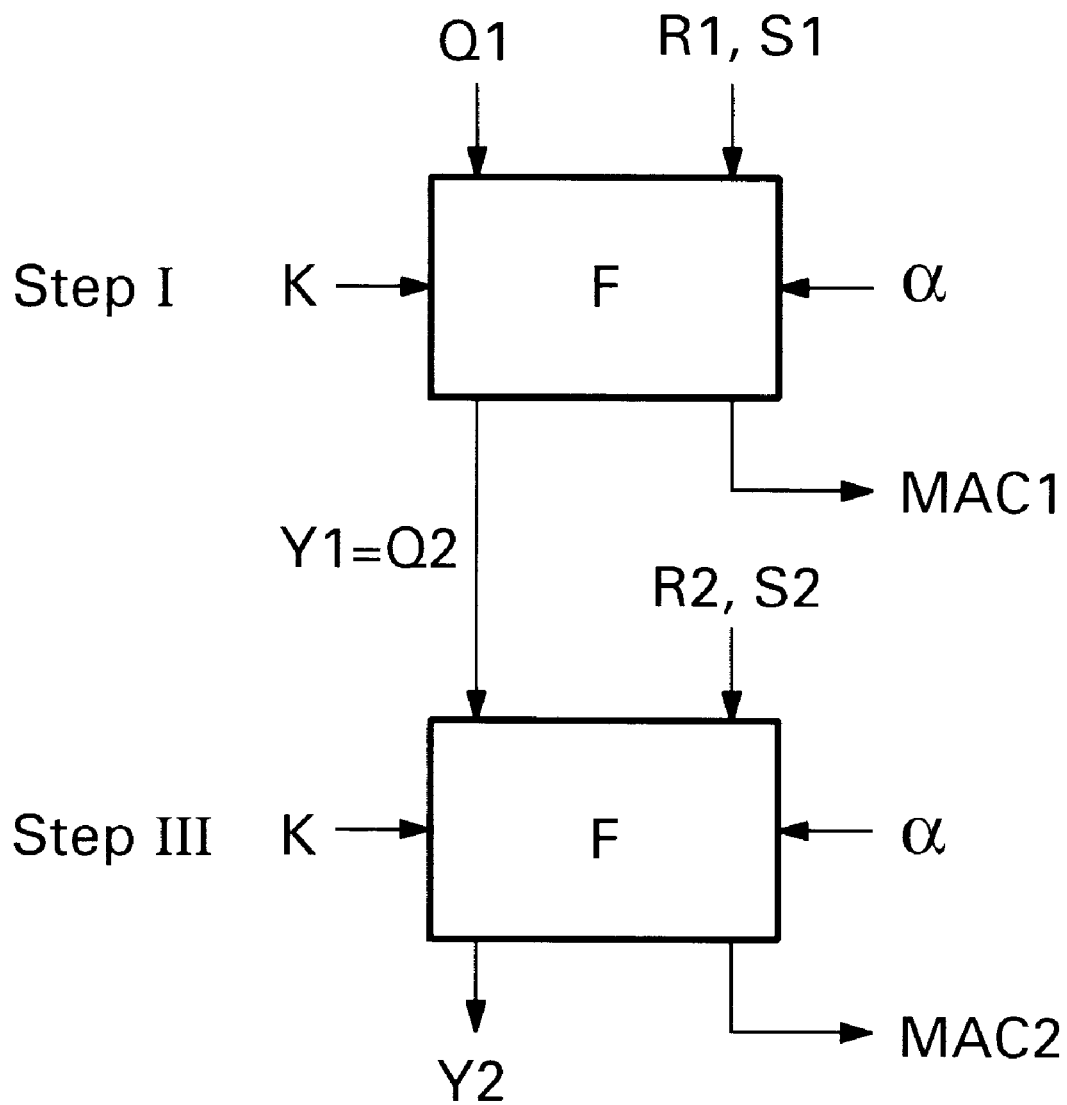
FIG. 3 schematically shows further details of a method in which the invention is applied.
Figure 4:
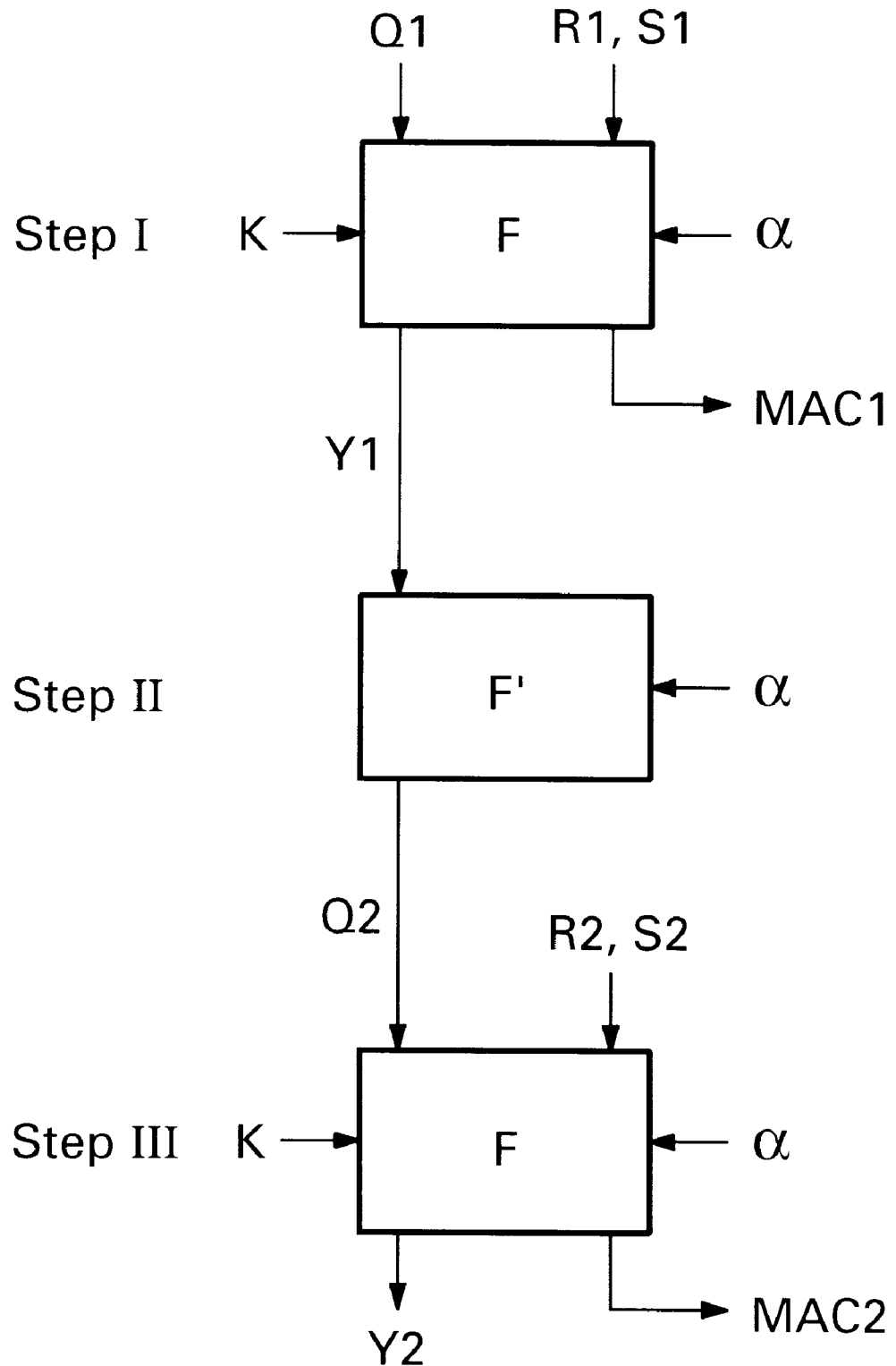
FIG. 4 schematically shows an alternative embodiment of the method of FIG. 3.

FIG. 4 shows the case in which the processing of the function F continues between the steps I and III under control of the clock α. Step I results in a code MAC1 and a first end value Y1, as in FIG. 3. This end value Y1 is "input" into the function F' as a starting value. As stated above, the end value Y1 is the state of the function F after completion of the code MAC1, so if the function continues processing said state maybe considered as start value. In FIG. 4, the function F is in step II denoted as F' as the function may not receive the input parameters R1, S1 and K.

In step III, the state (end value) of the function F' is used as start value Q2. Subsequently, MAC2 is produced using F and the input parameters R2, S2 and K.

In the example of FIG. 4, the start value Q2 is not identical to the end value Y1. However, the values Q2 and Y1 are related through the function F'. This still allows a check on the correspondence between the steps I and III.

It will be understood that the steps of FIGS. 3 and 4 are carried out both in the card and in the (security module of the) terminal. That is, both the card and the terminal produce the codes MAC1 and MAC2 as shown in FIG. 3 or FIG. 4. By comparing the received code with its counterpart produced in the terminal, it is possible for the terminal to determine the authenticity of the data received and to ascertain that only a single card is involved in the transaction.

On the basis of FIG. 5, it will be further explained how the method according to the invention may be applied with commercially available payment cards.

The integrated circuit 100 schematically shown in FIG. 5, which basically corresponds to the integrated circuit 15 in the payment means 11 of FIG. 1, comprises a first memory 101 and an address register 102. The memory 101 comprises multiple memory locations, which are addressed with the help of the address register 102, which is constructed as a counter. In response to a clock pulse α, which is generated outside the payment means, the address register 102 runs through a range of addresses. The memory 101 is constructed as a so-called EPROM or EEPROM memory and may, in response to (external) read/write signals R/W, be optionally written or read. Data, i.e., balances S1, S2 etc., are exchanged, by means of a data bus 103, with other parts of the integrated circuit 100.

A second memory 104 is constructed as a shift register having feedback. In many cases, said memory is formed by a dynamic memory, as a result of which the information stored in the memory is lost if said information is not regularly "refreshed." This point will be elaborated later. The random number R may be (temporarily) stored in an (optional) register 105. To the second memory 104 there are fed, by way of an (optional) combination circuit 106, both the random number R and a balance S from the register 105 and the memory 101, respectively. Possibly, still further parameters may be involved in the combination, such as a key K stored in the memory 101. At the (fed-back) output of the memory (shift register) 104 there originates the authentication code MAC (i.e., MAC1, MAC2, . . . ), which has therefore originated from the enciphered combination of the balance S, the random number R and possible other parameters, such as an identification code (e.g., a card number), a key K and the like. The feedback takes place by way of a number of modulo-2 adders and the combination circuit 106. The circuits 104, 106 and the adders connected thereto constitute the functions F and F' of FIGS. 3 and 4.

In practice, the integrated circuit 100 may comprise many other parts which are not essential, however, for the present invention.

In the event of existing methods and their implementations, the problem arises that for writing data (in this case balances) to the EEPROM memory 101 there is required a relatively long write time of, e.g., at least 5 ms. During the writing, there are supplied clock and write signals to the memory (shown as the signals α and R/W). In the event of existing payment cards, it is not possible during the writing to the EEPROM memory to supply another clock pulse to other parts of the integrated circuit 100. As a result, the contents of the dynamic memory 104 are lost, since said memory must regularly and within brief time intervals of, e.g., at least 0.1 ms, receive a clock pulse for "refreshing" the memory contents. After the writing of a balance to the EEPROM memory 101 (step II in FIG. 2), therefore, the contents of the dynamic memory 104 are lost and said memory should therefore be reset in order to achieve a defined initial state of the memory. Said reset may take place by feeding a series of zeros (or ones) to the input of the memory 104. For this purpose, the combination circuit 106 may be constructed in such a manner that on the basis of a certain control signal it issues only zeros (or ones) to its output.

Resetting the memory 104 has the drawback, however, that information which is related to the earlier steps of the method (step I in FIG. 2) is thereby lost. According to the invention, therefore, the information in the memory 104 is maintained. This is preferably achieved by having the writing of the data to the EEPROM memory 101 take place in such a manner that the refreshing of the dynamic memory 104 and possible other dynamic-memory elements, e.g., the register 105, is not disturbed. For this purpose, the frequency of the clock pulse α is always maintained at such a value that the refreshing of the dynamic memories is not endangered. Depending on the dynamic memory elements used, the clock frequency may amount to, e.g., at least 10 kHz. Since the (clock) pulse duration during the writing at such a clock frequency is too low (e.g., 0.05 ms at 10 kHz, while with a certain EEPROM memory there is required a pulse duration of at least 5 ms), the writing is carried out repeatedly. In other words, the same value (balance) is written to the same address of the memory 101 several times, until at least the total prescribed duration has been achieved. In the given example of a clock frequency of 10 kHz and a minimum write time of 5 ms, this means that a total of at least 100 times should be written to the same address.

The repeated write referred to above may be made difficult, however, by the fact that with each clock pulse in many existing payment cards the address register is raised (or lowered) by one. The actual write may therefore take place on only one of the many addresses, so that the entire address range should always be run through to write during one (relatively brief) clock pulse. As a result, the duration required for the writing is extended.

According to a further aspect of the invention, a solution for this is offered by varying the frequency of the clock α in such a manner that, during the running through of the address register and therefore in the absence of the write signal, the frequency of the clock α is raised in order to speed up running, and immediately before or during the writing the clock frequency is lowered in order to have the write pulse continue longer. It will be understood that the clock frequency can be lowered only to the extent permitted by the required refreshing of the dynamic memory.

Also, the shape of the clock pulse may advantageously be adjusted, so that the 1/0 ratio amounts not to 50/50 but, e.g., to 70/30 or 90/10. This results in a longer write pulse (if writing takes place with a clock pulse equal to 1) and therefore in a shorter total write time without, however, disturbing the refreshing of the dynamic memory.

Adjusting the shape of the clock pulse may advantageously be combined with varying the clock frequency. In addition, the address register may advantageously be constructed in such a manner that it does not generate more different addresses than strictly necessary. By restricting the number of possible addresses, the time required for running through the address register may be effectively restricted.

As explained above, the invention is based on the fact that no authentication information is lost between the various steps of the method. For this purpose, it is ensured that dynamic registers and memories maintain their contents, even during a write to a memory requiring a relatively long write time, such as an EEPROM memory.

In practice, the method may be implemented in the form of software in the payment station, particularly in a so-called card reader of the payment station.

It will be understood by those skilled in the art that the invention is not limited to the embodiments shown, and that many modifications and amendments are possible without departing from the scope of the invention. Thus, the principle of the invention is described above on the basis of debiting a payment means, but such principle may also be applied to crediting a payment means.

What is claimed as new and is desired to be secured by Letters Patent of the United States is:

1. A method of performing a transaction between an electronic payment mechanism and a payment station, comprising:
   requesting, by said payment station, payment data from said payment mechanism;
   generating a plurality of authentication codes in which each authentication code of said plurality of authentication codes is linked to a preceding authentication code in a same transaction between said payment mechanism and said payment station; and
   transmitting, by said payment mechanism, said requested payment data including a respective authentication code of said plurality of authentication codes, to said payment station.

2. The method according to claim 1, wherein said step of generating said plurality of authentication codes generates at least one authentication code using an initial value derived from a final state of a previously generated authentication code.

3. The method according to claim 1, wherein said step of generating said plurality of authentication codes generates at least one authentication code using a key.

4. The method according to claim 1, wherein said step of generating said plurality of authentication codes generates at least one authentication code using a random value.

5. A method of performing a transaction between an electronic payment mechanism and a payment station, comprising:

transferring, by said payment station, a first random value to said payment mechanism;

determining a first authentication code using at least a first value, the first random value, and a first balance of said payment mechanism;

generating a first end value corresponding to said first authentication code;

transferring, by said payment mechanism in response to said first random value transferred by said payment station, said first authentication code to said payment station;

transferring, by said payment station, a debiting command to said payment mechanism;

reducing said first balance of said payment mechanism to a second balance using said debiting command;

transferring, by said payment station, a second random value to said payment mechanism;

determining a second authentication code using at least a second start value, the second random value, and said second balance of said payment mechanism; and transferring, by said payment mechanism in response to said second random value transferred by said payment station, said second authentication code to said payment station, wherein in said step of determining said second authentication code, said second start value is based on said first end value.

6. The method according to claim 5, wherein in said step of determining said second authentication code, said second start value is identical to said first end value.

7. The method according to claim 5, further comprising:

determining at least one of said first authentication code and said second authentication code using a key and an identification code.

8. The method according to claim 5, further comprising:

determining said first end value, said first authentication code, and said second authentication code using a cryptographic function.

9. The method according to claim 5, further comprising:

transferring, by the payment mechanism, said first balance and said second balance to said payment station; and recording, by the payment station, a difference between said first balance and said second balance.

10. The method according to claim 5, further comprising:

setting said second random value to be identical to said first random value before transferring said second random value.

11. The method according to claim 5, further comprising:

repeatedly writing at least one of said first balance and said second balance to a rewritable memory of said payment mechanism in accordance with predetermined clock pulses such that contents of a dynamic memory of said payment mechanism are maintained, said contents of the dynamic memory including at least one of said first authentication code, said second authentication code, said first random number and said second random number.

12. The method according to claim 11, wherein said step of repeatedly writing writes said at least one of said first balance and said second balance to said rewritable memory between 50 and 150 times.

13. The method according to claim 11, further comprising:

increasing a frequency of said predetermined clock pulses.

14. The method according to claim 11, further comprising:

adjusting a shape of said predetermined clock pulses to comprise an asymmetric 1/0 ratio.

15. A smart card, comprising:

a memory which stores data corresponding to a balance of said smart card;

a feedback shift register which produces at least one authentication code for said smart card;

a logic circuit connected to the memory and the feedback shift register, said logic circuit combines data from said memory and feedback data from said feedback shift register and inputs said combined data to said feedback shift register; and a clock generator which generates a clock pulse which controls an operation of said memory and said feedback shift register, wherein contents of said feedback shift register are maintained by varying at least one of a frequency and a ratio of said generated clock pulses.

16. A smart card according to claim 15, further comprising:

a register connected to said logic circuit, said register stores a random value.

17. A smart card, comprising:

a memory which stores data corresponding to a balance of said smart card;

a feedback shift register which produces at least one authentication code for said smart card;

a logic circuit connected to the memory and the feedback shift register, said logic circuit combines data from said memory and feedback data from said feedback shift register and inputs said combined data to said feedback shift register; and a clock generator which generates a clock pulse which controls an operation of said memory and said feedback shift register, wherein contents of said feedback shift register are maintained by repeatedly writing said data corresponding to said balance to said memory between 50 and 150 times.

* * * * *